United States Patent [19]
Herdeg et al.

[11] Patent Number: 5,680,584
[45] Date of Patent: Oct. 21, 1997

[54] SIMULATOR SYSTEM FOR CODE EXECUTION AND DEBUGGING WITHIN A MULTI-ARCHITECTURE ENVIRONMENT

[75] Inventors: Mark A. Herdeg, Leominster, Mass.; Michael V. Iles, Hampshire, England

[73] Assignee: Digital Equipment Corporation, Maynard, Mass.

[21] Appl. No.: 342,668

[22] Filed: Nov. 21, 1994

Related U.S. Application Data

[63] Continuation of Ser. No. 666,022, Mar. 7, 1991, abandoned.

[51] Int. Cl.$^6$ .................. G06F 9/06; G06F 9/44; G06F 11/00
[52] U.S. Cl. .................. 395/500; 395/800; 395/183.14; 395/704; 364/578
[58] Field of Search .................. 395/800, 500, 395/700, 733, 183.07, 183.13, 183.14, 704; 364/DIG. 1, DIG. 2, 550, 481, 551.01, 578, 489, 488; 340/825.31

[56] References Cited

U.S. PATENT DOCUMENTS

| | | | |
|---|---|---|---|
| 4,077,058 | 2/1978 | Appell et al. | 395/650 |
| 4,084,235 | 4/1978 | Hirtle et al. | 395/500 |
| 4,297,743 | 10/1981 | Appell et al. | 395/650 |
| 4,630,231 | 12/1986 | Hirata et al. | 358/342 |
| 4,755,997 | 7/1988 | Takahashi | 395/183.14 |
| 4,802,165 | 1/1989 | Ream | 395/183.14 |
| 4,811,345 | 3/1989 | Johnson | 395/325 |
| 4,881,228 | 11/1989 | Shouda | 395/183.14 |
| 4,992,934 | 2/1991 | Portanova et al. | 395/325 |
| 5,029,069 | 7/1991 | Sakamura | 395/375 |
| 5,050,168 | 9/1991 | Paterson | 395/375 |
| 5,063,499 | 11/1991 | Garber | 395/500 |
| 5,142,622 | 8/1992 | Owens | 395/200 |
| 5,167,023 | 11/1992 | de Nicolas | 395/375 |
| 5,210,832 | 5/1993 | Maier et al. | 395/375 |

OTHER PUBLICATIONS

Robert L. Hummel, *PC Magazine Programmer's Technical Reference: The Processor and Coprocessor*, pp. 61–64, 1992.

Electronics & Wireless World. vol. 96, No. 1655, Sep. 1990, Sutton GB, pp. 801–804, John Mosely: "Simulation on a Budget Avsim51".

Microprocessing and Microprogramming, vol. 24, No. 1–5, 1 Sep. 1988, Amsterdam, pp. 149–152, Erik Dirkx et al.: "An Animated Simulation Environment for Microprocessors".

*Primary Examiner*—Daniel H. Pan
*Attorney, Agent, or Firm*—Diane C. Drozenski; Ronald C. Hudgens; Arthur W. Fisher

[57] ABSTRACT

A computer system embodies a first hardware (X) architecture for providing an X domain for an X code. The computer system includes a system for simulating a second hardware (Y) architecture providing a Y domain for Y code and for executing the Y code, and a debugger operable in the Y domain for debugging the X and Y codes. The simulating system includes a sub-system for providing support services for the debugger to enable it to debug the Y code, including modification of Y machine state and setting of breakpoints. The computer system also includes a sub-system for generating a call for cross-domain memory data access under predetermined conditions, such as direct memory access failures.

12 Claims, 7 Drawing Sheets

SIMULATOR SYSTEM FOR CODE EXECUTION AND DEBUGGING WITHIN A MULTI-ARCHITECTURE ENVIRONMENT

This application is a continuation application Ser. No. 07/666,022, filed Mar. 7, 1991, now abandoned

CROSS REFERENCE TO RELATED APPLICATIONS

Reference is made to the following concurrently filed patent applications assigned to the present assignee and hereby incorporated by reference:

Ser. No. 07/666,039 filed on Mar. 7, 1991, now abandoned, (PD91-0078/1870-0411) entitled IMPROVED SYSTEM AND METHOD FOR EXECUTING MULTIPLE CODES IN A MULTI-ARCHITECTURE ENVIRONMENT WITH CODE DEBUGGING CAPABILITY and filed by Mark A. Herdeg, James A. Wooldridge, Scott G. Robinson, Ronald F. Brender and Michael V. Iles.

Ser. No. 07/666,028 filed on Mar. 7, 1991, now abandoned, (PD91-0105/1870-0416) entitled SYSTEM AND METHOD FOR AUTOMATICALLY INTERFACING CALL CONVENTIONS BETWEEN TWO DISSIMILAR PROGRAM UNITS and filed by Daniel L. Murphy.

Ser. No. 07/665,888 filed on Mar. 7, 1991, now abandoned, (PB91-0147/1870-0419) entitled IMPROVED SOFTWARE DEBUGGING SYSTEM AND METHOD ESPECIALLY ADAPTED FOR CODE DEBUGGING WITHIN A MULTI-ARCHITECTURE ENVIRONMENT and filed by James A. Wooldridge, Ronald F. Brender and Henry N. Grieb, III.

Ser. No. 07/666,072 filed on Mar. 7, 1991, now abandoned, (PD91-0166/1870-0421) entitled IMPROVED SYSTEM AND METHOD FOR DETECTING CROSS-DOMAIN INSTRUCTION CALLS AND DATA REFERENCES ESPECIALLY ADAPTED FOR CODE INTERFACE JACKETING IN A MULTI-CODE EXECUTION AND DEBUGGING SYSTEM WITHIN A MULTI-ARCHITECTURE ENVIRONMENT and filed by Mark A. Herdeg, Scott G. Robinson, Ronald F. Brender and Michael V. Iles.

Ser. No. 07/665,752 filed on Mar. 7, 1991, now U.S. Pat. No. 5,339,422, (PD91-0167/1870-0422) entitled IMPROVED SYSTEM AND METHOD FOR JACKETING CROSS-DOMAIN CALLS IN A MULTI-CODE EXECUTION AND DEBUGGING SYSTEM WITHIN A MULTI-ARCHITECTURE ENVIRONMENT and filed by Ronald F. Brender and Michael V. Iles.

Ser. No. 07/665,886 filed on Mar. 7, 1991, now abandoned, (PD91-0209/1870-0423) which is entitled FASTER PROCESS FOR DEVELOPING NEW COMPUTER SYSTEMS EMPLOYING NEW AND BETTER PROCEDURES FOR SOFTWARE DEVELOPMENT AND TESTING and filed by Robert V. Landau, James E. Johnson and Michael V. Iles.

Reference is also made to the following concurrently filed patent applications assigned to the present assignee:

Ser. No. 07/666,071 filed on Mar. 7, 1991, now abandoned, (PD91-0063/1870-409) entitled IMPROVED SYSTEM AND METHOD FOR PRESERVING INSTRUCTION STATE-ATOMICITY FOR TRANSLATED PROGRAM CODE and filed by Scott G. Robinson, Richard Sites and Richard Witek.

Ser. No. 07/666,025 filed on Mar. 7, 1991, now U.S. Pat. No. 5,307,504, (PD91-0074/1870-0410) which is hereby incorporated by reference and which is entitled IMPROVED SYSTEM AND METHOD FOR PRESERVING INSTRUCTION GRANULARITY FOR TRANSLATED PROGRAM CODE and filed by Scott G. Robinson and Richard Sites.

BACKGROUND OF THE INVENTION

The present invention relates to methods and systems for simulating hardware architectures, and more particularly to simulator methods and systems especially adapted for code execution in a multi-code execution and debugging system within a multi-architecture environment.

A conventional software simulator of a computer hardware architecture can execute code containing instructions designed for the architecture being simulated on a computer having a different architecture. Typically, the conventional simulator is employed where a need exists to test and debug software being developed for the simulated architecture and where a computer embodying the simulated new architecture, is undergoing development or is otherwise unavailable.

The conventional simulator is often used in testing and debugging operating system software, but such simulators have limited use in developing user application or other higher level software which have external run-time dependencies. For example, run-time libraries and the operating system itself may not be available for the new architecture, and a new program that makes library and operating system calls will not be executable by the simulator on the native hardware unless extensive modifications are made in the new application program to remove the unavailable external dependencies.

A need has thus existed for executing, testing, and debugging new software designed for any operating level within a new hardware architecture even though the new hardware, new operating system therefor, and accompanying support software are not available. A new system and method disclosed in the cross-referenced patent application Ser. No. 07/666,039 and other cross-referenced applications execute multiple codes in a multiple architecture environment to meet this and related needs.

The present invention is directed to a new and improved simulator and simulating method that can be employed to provide a simulated architecture (domain) in a multi-architecture environment and thereby enable multiple codes to be executed for code testing or other purposes.

SUMMARY OF THE INVENTION

A simulating system is provided in a computer system that embodies a first hardware (X) architecture and includes a memory system and a system for executing and debugging multiple codes having an environment manager that handles cross-domain calls. The simulating system simulates at least a second computer hardware (Y) architecture on the computer system as part of the multi-code executing and debugging system in a multi-architecture environment.

Means are provided for simulating the state of a machine designed in accordance with the Y architecture. Stored Y-code routines are executed on the simulating means.

Call response means are provided for responding to calls from the environment manager to initiate operation of the executing means when a code execution call is received. Each initiated Y-code execution is terminated in response to predetermined conditions and returned to the environment manager.

BRIEF DESCRIPTION OF THE DRAWINGS

The accompanying drawings, which are incorporated in and constitute a part of this specification illustrate one embodiment of the invention and together with the description provide an explanation of the objects, advantages and principles of the invention. In the drawings.

DESCRIPTION OF THE PREFERRED EMBODIMENT

Figure 1:
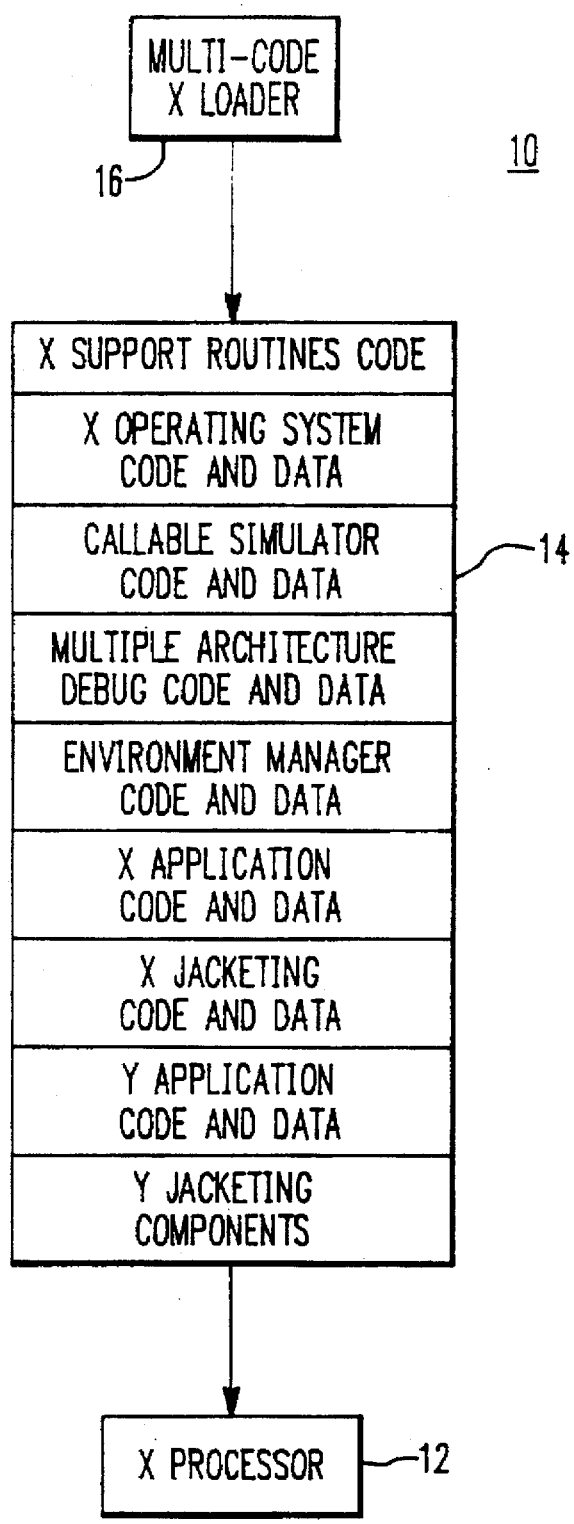
FIG. 1 shows a functional block diagram of a system for executing and debugging multiple codes in a multi-architecture environment.

FIG. 1 shows a system 10 that is arranged to execute and debug multiple codes in a multi- architecture environment. An X processor 12 forms a part of a real X architecture that provides for the execution of multiple codes including X code. The X code includes programmed instructions designed to operate in the X architecture.

Generally, the system 10 can be operated to process and execute multiple codes, but in the preferred embodiment, the system 10 is structured for executing two codes, the X code and another code designated as Y code. The Y code includes programmed instructions designed to execute on a machine whose architecture is being simulated by the X processes 12. In the preferred embodiment, the system 10 may directly execute a new user application level or other level program compiled in or translated to the Y code, and in doing so make use of X operating system and support software.

As an example of a commercial application of the system 10 for translated X program code, the X code may be a complex instruction set code (CISC) for which a hardware implementation exists, and the Y code may be a reduced instruction set code (RISC) for which no real RISC hardware exists. A typical CISC system is the VAX® computer system manufactured by the assignee of the present application. Reference is made to the cross-referenced applications which are related to CISC-to-RISC translation systems.

The system 10 further includes a memory system 14 having a general layout for program and data components as shown in FIG. 1. An X loader 16 provides for program code entry into the memory system 14 as more fully described in the cross-referenced application Ser. No. 07/666,039.

Figure 2A:
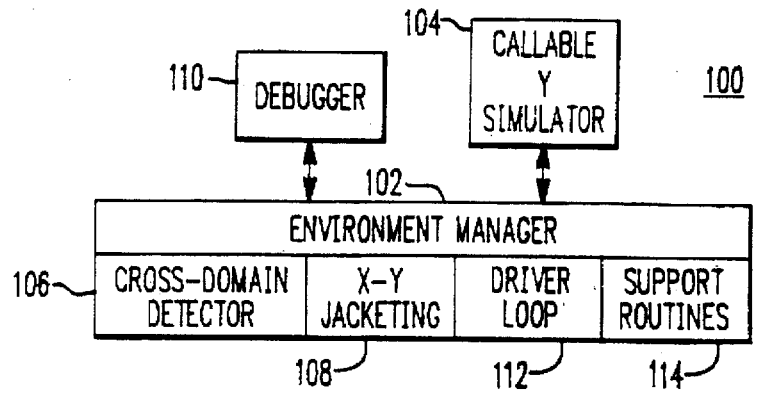
FIG. 2A shows a more detailed functional block diagram of a software system which is employed in the system of FIG. 1 and which includes a callable simulator arranged in accordance with the present invention.

FIG. 2A shows the architecture of a software system 100 which can be executed by the system 10. A callable simulator 104 functions as part of software system 100 (FIG. 2A) within a second architecture (domain, which is preferably a Y architecture embodied in the X hardware. The simulator 104 is structured to emulate Y hardware on the X hardware that may be under development and unavailable. Generally, the simulator 104 executes Y instructions on call from X code through an environment manager 102. Calls may also be made from the Y code through the environment manager 102 for X code execution. For example, the Y code may represent a user level application program and may call for execution of a routine that is located in an X library or it may make a call requiring operating system processing in the X domain.

A debugging capability need not be included in the system 10 where system operation is limited to multi-code execution. However, debugging is provided where the system 10 is to be used for code testing.

A debugger system 110 provides for debugging operations within the Y domain under control of the environment manager 102. In its total operation, the debugger system 110 provides the user with control over the execution of code in either domain so that the whole execution process may be examined and modified to correct malfunctions. Generally, the debugger system provides the procedures needed for debugging operations such as setting breakpoints in both the X and Y domains. The debugger 110 is structured for interaction with the callable simulator 104 within the system 100. Reference is made to the cross-referenced application Ser. No. 07/665,888 for a detailed description of the structure and operation of the debugger 110.

A cross-domain detector system 106 is employed by the environment manager 102 to determine when a cross-domain call is made during the execution of either the X code or the Y code. An X–Y jacketing system 108 operates within the environment manager system 102 to provide the X and Y executable instruction interfacing needed to implement cross-domain calls between routines. Reference is made to patent application Ser. Nos. 07/666,072 and 07/665,752 for more detailed disclosure of the detector and Jacketing systems 106 and 108.

The environment manager 102 exercises supervisory control over the callable simulator 104 and the debugger 110 through the execution of a driver loop 112. Support routines 114 provide various services, especially on request from the debugger 110.

With use of the code translation system and method disclosed in the cross-referenced applications application Ser. Nos. 07/666,071 and 07/666,025 CISC user level and other X programs can be translated to functionally equivalent RISC Y programs which can be executed on real CISC X hardware by the system 10 for testing and debugging purposes even though operable RISC Y hardware is unavailable.

Advantageously, an X program can be partly translated to Y program code, or a new program can be partly written in Y code for execution with supporting or other X program code, and the mixed X–Y program code can be executed by the system 10 for testing and debugging of both the X and Y codes. The Y code is executed, tested and debugged on the simulated architecture and the remaining X code is executed, tested and debugged on the native architecture. With successful testing of the existing Y code, additional segments of X code can be translated for stepped Y code testing and debugging until the X code is fully translated and the Y code testing and debugging is completed. With the use of progressively stepped testing and debugging, the entire testing and debugging process is facilitated.

Overall, a program can be executed and tested for the Y architecture by translating or compiling it into Y code and running the Y code on the callable system simulator with the run-time environment for the Y code being provided by the operating system and run-time libraries executing on the X or native hardware architecture that is included in the multi-architecture system. The composite software thus includes X and Y codes that are properly executed on the combined X (real) and Y (simulated) architectures. In the preferred embodiment described herein, the operating system for the composite software system is structurally included in the X architecture.

The code boundary between the real and simulated architectures is generally open to the system user's needs. For example, the code boundary can be between the program being ported and the X operating system, or as indicated above it can even be within the program being ported.

The software system 100 generally has application to widely different architectures. The system 100 also has application to architecture-implementation systems that have different operating systems and different calling systems, but such application is facilitated if the architecture-implementation systems have similar operating systems and similar calling standards. Reference is made to the cross-referenced application Ser. No. 07/665,752 for additional background information on calling systems and differences among them.

DRIVER LOOP

Figure 5:
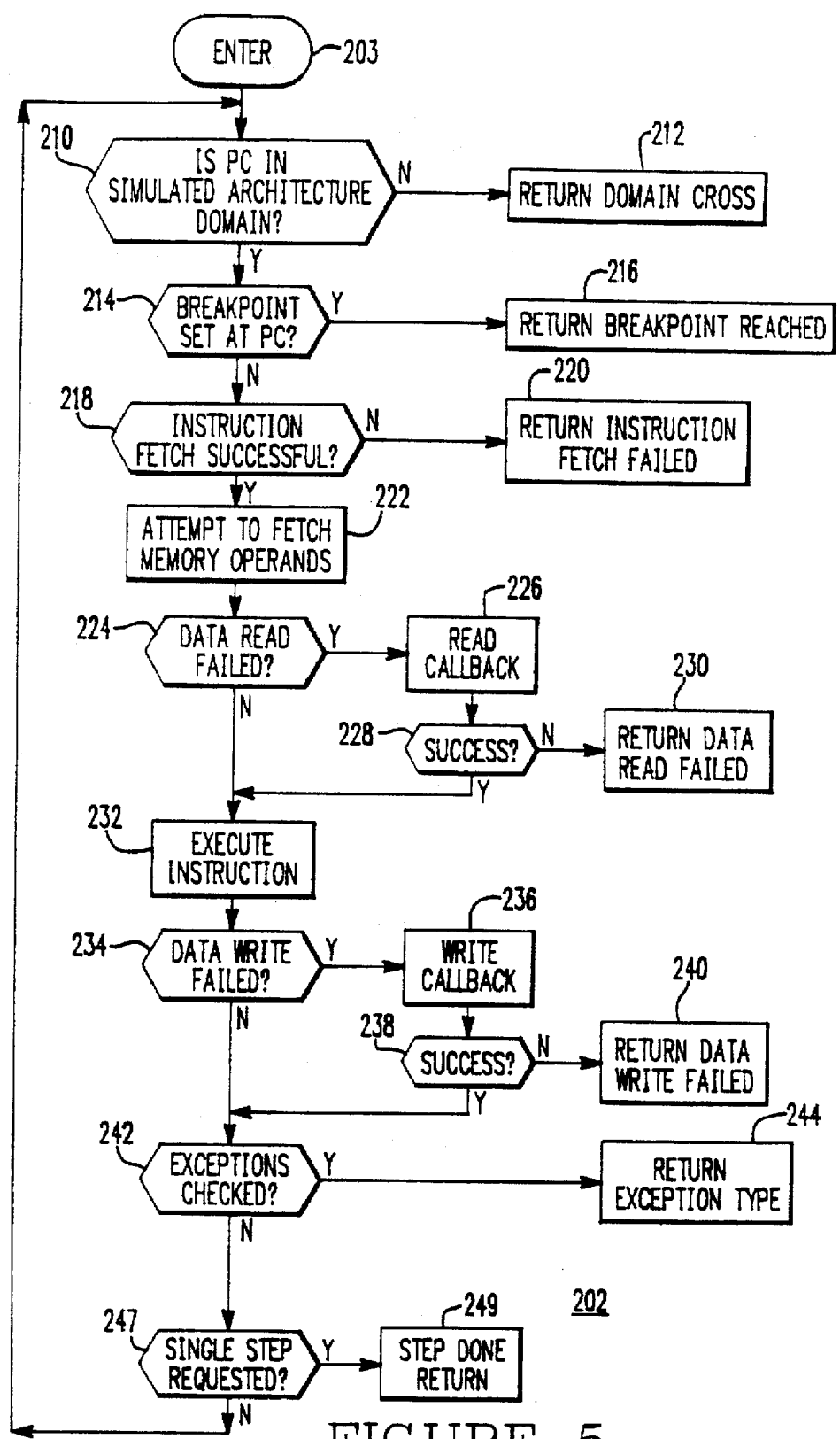
FIG. 5 shows a flow chart for RUN and SINGLE STEP routines employed by the callable simulator to control the execution of instructions in the simulated architecture.

In FIG. 5, there is shown a flow chart for the driver loop 112 which drives the simulation/debugging operation. Entry is made to the loop 112 at block 118 when a call is made from X code, often from X application code for execution of a Y routine through the jacketing system 108. Jacketing provides interfacing between the X and Y codes to adjust for calling standard differences.

In block 120, parameters are set up as part of the jacketing process, and in particular X parameters are placed in appropriate Y locations for use during Y code execution. Thus, for normally jacketed routine calls, jacketing tables are referenced in the jacketing system 108 to determine where parameters come from in the X domain and where the corresponding values must be placed in the Y domain. For auto-jacketed routine calls, standard call rules are embedded in special code for this purpose in the jacketing system 108. More detail on jacketing for domain interface purposes is set forth in the cross-referenced application Ser. No. 07/665,752.

A special or distinguished return address is placed in the standard return-address register. The distinguished return address is outside the address bounds previously established as containing Y code. It must also be different from an address that might be used to encode a Y–X call.

In functional block 122, a string variable named ENV_CMD is set by default to RUN mode (continuous instruction execution) or it may be set to STEP mode (instruction-by-instruction execution) by a user selection from the debugger 110. For example, the user may decide to perform maintenance on the particular Y routine that has been called by an X code routine, and accordingly may make a STEP MODE selection for the Y domain.

The simulator 104 is called by block 124 to simulate the Y machine in accordance with the selected mode and the current Y machine state. One or more Y instructions are then executed in the Y domain by the X hardware.

Block 126 next provides for driver loop termination and return according to detected conditions returned from the simulator 104 after its operation has terminated. If the Y program counter is determined to be out of bounds previously established as containing Y code and data as indicated by block 126, a test block 130 determines whether the Y program counter is making a return to the caller X program.

If the Y program counter matches the distinguished return address in the block 130, execution of the Y routine has been completed and is making a return to its X caller. Block 132 then provides jacketing services, i.e., it copies values as appropriate from the Y result register(s) to the X domain. Normally jacketed calls are processed with the jacketing tables used to initiate the original call. The previously referenced special jacketing code is used for auto-jacketed calls. Simulation is complete at this point as indicated by exit block 134.

If the test block 130 determines that the Y program counter corresponds to a jacketing table entry and does not match the distinguished return address, a call is being made for execution of an X routine within the current execution process in the Y domain (in the absence of a programming error). Block 136 then provides jacketing services, i.e., it initiates a Y–X call and the jacketing system 108 accesses the jacketing tables to obtain the information needed to copy parameters from the Y-domain to the X domain, the address of the X routine being called, etc. When a return is made to the block 136 from the called X routine, the return value is copied into the Y domain and simulation is resumed as indicated by path 137.

With reference again to block 126, if the STEP mode had been requested and the simulation termination is accordingly determined to be a case called Step Done as indicated by block 138, functional block 140 calls the debugger 110 to indicate completion of the requested step operation and pass the previously returned status and the variable ENV_CMD. A return to the simulator enables resumed simulation without requiring direct simulator recall by the debugger 110.

The debugger 110 interprets the status and may make a report to the user. Additional simulator step operations may be requested by the debugger 110 in accordance with a previously established internal script or by user selection. The driver variable ENV_CMD is set to RUN or STEP according to debugger requests.

The debugger 110 calls the environment manager 102 to perform other inquiry and status control functions (such as set BREAKPOINT) as more fully considered in the cross-referenced application Ser. No. 07/665,888. In the present embodiment, simulation is controlled only by the driver 112.

If the simulation termination is due to an abort 142 or a breakpoint 144 or Y errors 146, block 148 calls the debugger 110 and operates in the manner described for the block 140.

CALLABLE SIMULATOR

Figure 4:
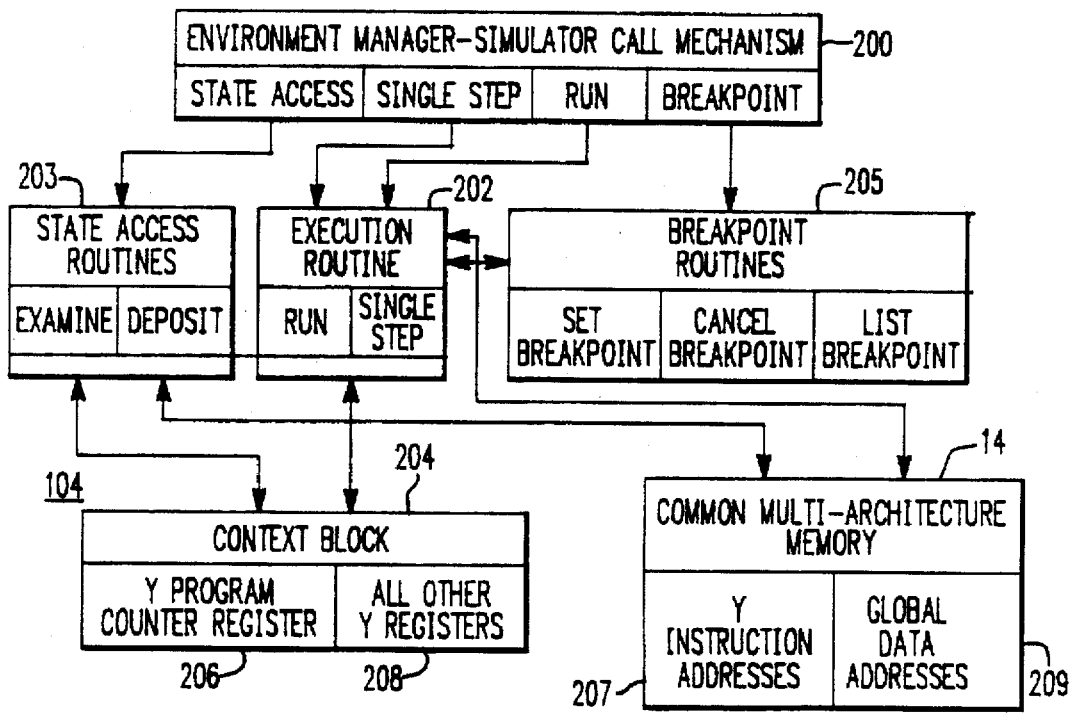
FIG. 4 shows a functional block diagram representing the software and hardware structure of the callable simulator of FIG. 2 and related system components.
Figure 3:
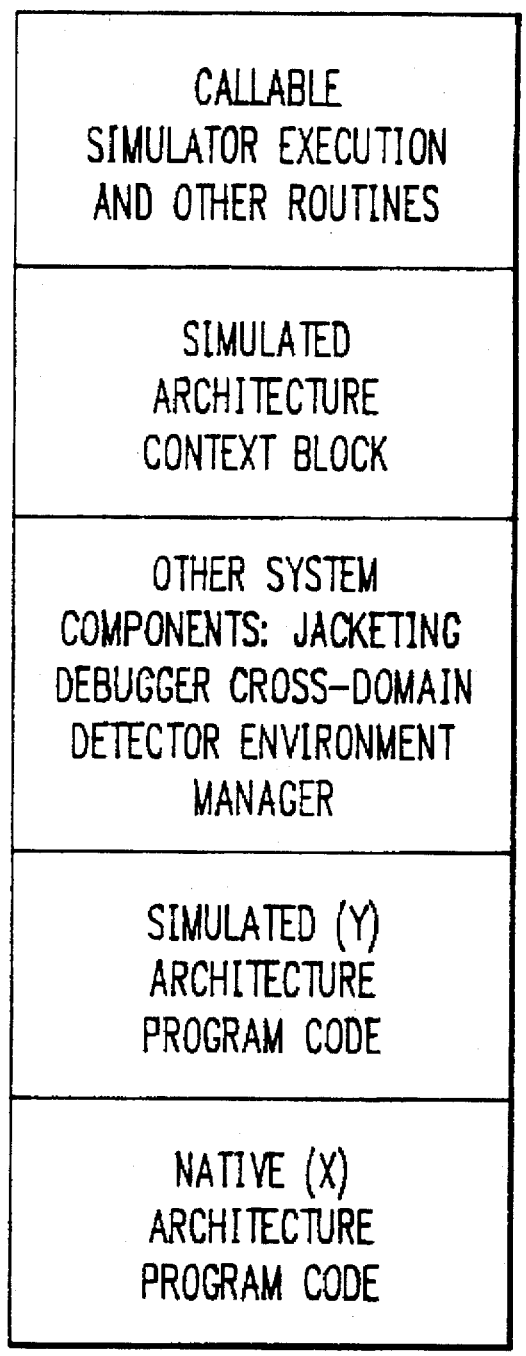
FIG. 3 shows in greater detail an organization diagram for a portion of the computer memory system of FIG. 1 that is most pertinent to the callable simulator.

The callable Y simulator 104 is shown in greater detail in FIG. 4. It provides a number of services to the software system 100 that may be classified into two categories: execution services and debug support. The most relevant portions of the memory system 14 employed in operating the simulator 104 to provide these services are shown in FIG. 3.

When a system call is made for simulator execution from the environment manager 102, an execution routine 202 (FIG. 4) is called to direct correct execution of the Y instructions and to provide returns under various circumstances as more fully described hereinafter. Once the callable simulator 104 is called to begin execution, it continues to execute Y instructions and updates the simulated machine state (content block and memory) until any of multiple predetermined conditions arise to stop the execution and make a return to the caller. A unique return status is returned for each return reason.

State access routines 203 and BREAKPOINT routines 205 are also included in the simulator 104 to provide debugger services and are executed when a call is made for special functions provided by the routines 203 or 205.

The machine state of the simulated Y architecture is contained in a single, globally-defined context block 204 (FIG. 4). As shown, the context block 204 includes the Y program counter (PC) register 206 and all other Y registers 208.

The PC register 206 contains address data 207 of the next Y instruction to be executed. All instruction addresses 207, as well as all global data addresses 209 in the simulated architecture (Y) code, are located in shared address space in the common memory 14 for the multi-architecture system 10. No separate Y code private memory is maintained by the simulator 104 whereas conventional simulators normally do maintain a separate private memory. With common memory and shared common addresses between the X and Y architectures, multiple architecture programs with global data structures shared between X and Y routines will execute properly without modification.

The initial Y machine state is set up prior to simulator operation by the environment manager 102 by writing to the context block 204 and by initializing program memory 207 and 209. In particular, the address for the first simulated (Y) machine instruction to be executed is written to the PC register 206.

SIMULATOR EXECUTION ROUTINE

A flow chart is shown in FIG. 5 for the simulator execution routine 202. The execution routine 202 responds to calls from the environment manager 102 and provides execution services for both the RUN mode of operation and the SINGLE STEP mode of operation.

Figure 2B:
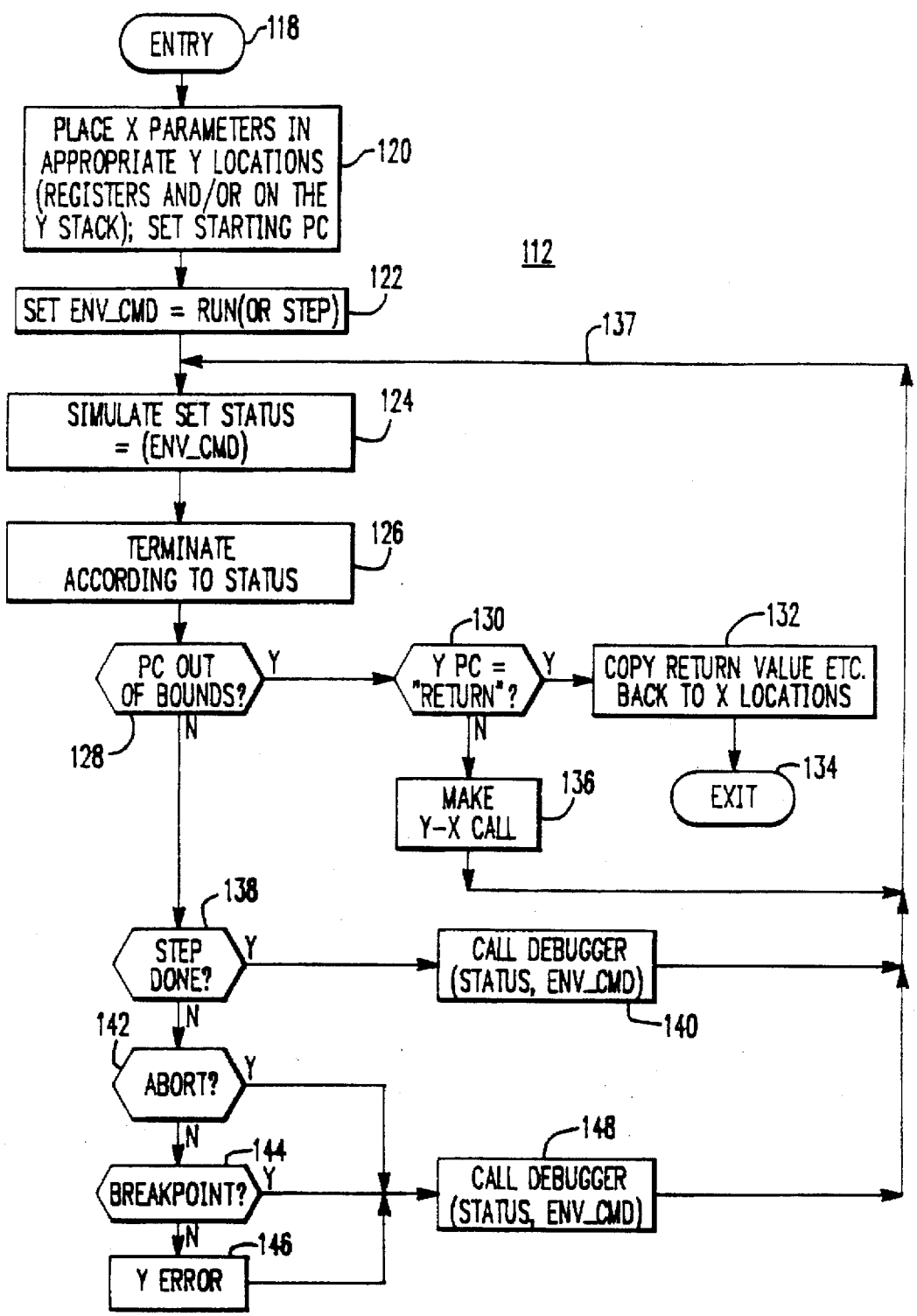
FIG. 2B shows a flow chart for a driver loop employed in the system of FIG. 2A.

An entry block 203 responds to Y-code execution calls and other calls from the environment manager 102 to initiate operation of the simulator execution routine 202. A functional block 210 next makes a test to determine whether the instruction address in the Y PC register 206 is in the Y domain. If it is not, a return is made for a domain cross as indicated by the reference character 212. Subsequently, the environment manager 102 (FIG. 2) reads the Y PC register 206 to obtain the instruction memory address for instruction execution in the cross-domain, i.e., the X domain.

Otherwise, the routine 202 continues to execute, and a functional block 214 determines whether the PC register 206 has reached a breakpoint that may be present to support program debugging operations. If so, a breakpoint return 216 is made to the environment manager 102. A breakpoint exists if it is contained in a list generated by a service routine described subsequently herein.

If there is no breakpoint, the instruction to be executed is fetched, and functional block 218 determines whether the fetch has been successful. If not, an instruction fetch failure return 220 is made to the environment manager 102. Otherwise, the routine 202 continues to be executed.

Block 222 next fetches the instruction operand(s) from the memory 209 or registers 208 and test block 224 determines whether the memory operand data, if any, has been successfully read. If so, block 226 calls a read back routine in the environment manager 102, and block 228 tests whether the call back has succeeded. If not, a read failure return 230 is made indicating the detected exception condition to the environment manager 102.

Generally, the read call back routine, or a write call back routine subsequently considered herein, is called if the simulator 104 is unable to read from or write to the memory referenced as data by the instruction undergoing simulator execution. The simulator 104 supplies the address and size of the data reference to the call back routine as provided by the environment manager 102.

In this manner, unusual cases can be handled where data in memory cannot be directly shared between the two domains because of differing data structure alignment requirements or a need to prohibit access unprivileged codes. The environment manager call back routines can perform the memory access through:

1. privileged code in the native (X) architecture if the memory had been protected (simulator only runs nonprivileged Y code), or 2. data jacketing code in the environment manager 102 if the memory had been intentionally made inaccessible because the data formatting conditions are different in the X and Y architectures.

If the call back routine does not succeed, the address is actually inaccessible and a failure is returned as indicated above. Reference is made to the cross-referenced application 666,072 for more information on special cross-domain memory data references.

In the execution routine 202, functional block 232 executes the current instruction once the block 224 or 228 indicates a successful operand data read. As part of execution, the memory 209 and/or register 208 may be modified, and the PC 206 is updated. Test block 234 then verifies that memory data, if any, resulting from the instruction execution has been successfully written to memory.

If the memory write has failed, block 236 calls a write call back routine in the environment manager 102 and block 238 determines whether the call back has succeeded. If not, a return 240 is made to stop the simulator execution as previously described for the read call back routine. The write call back routine functions as previously described.

After a successful data write, exceptions resulting from the instruction execution are checked by block 242 and, if any occurred, an exception return 244 is made to the environment manager for exception handling by the X operating system. A complete list of possible exceptions is defined by the simulated (Y) architecture, and each listed exception is checked by the block 242. In the preferred embodiment, the exceptions list includes various arithmetic conditions, illegal instructions, unaligned data addresses, and memory access failures.

An example exception is an arithmetic overflow that may occur while the simulator 104 is executing an add instruction. Since exceptions are transferred to the operating system for handling, and since in the present embodiment the operating system operates in the X or cross-domain, the simulator 104 returns an encountered exception for handling by the X operating system in the native architecture.

With reference again to the routine 202, test block 247 then determines whether the SINGLE STEP mode has been requested by the user for debugging purposes. If so, a return is made by block 249 since the single step operation is complete. The SINGLE STEP mode accordingly permits the simulator 104 to be operated one instruction at a time to facilitate examination and revision of program instructions.

If not, the RUN mode has been requested, and execution continues with the next instruction. The routine 202 is then reexecuted through the block 210 and it continues to be executed cyclically subject to the described returns. As the routine 202 is executed, the Y machine state context block 204 and memory data 209 are updated. As previously indicated, a unique status code is returned by the routine 202 for each return.

SUPPORT ROUTINES

Service routines are provided by the simulator 104 to implement calls from the environment manager 102 for debugger support. The STATE ACCESS routines block 203 (FIG. 4) includes additional callable debugging support routines (FIG. 6) that provide for modifying the simulator state and for reading and displaying the contents of the simulator registers 206 and 208 and simulator memory (instructions 207 and data 209) in a format defined by the Y architecture. Such access to simulator state may be used by the user to find and fix program malfunctions.

Figure 6:
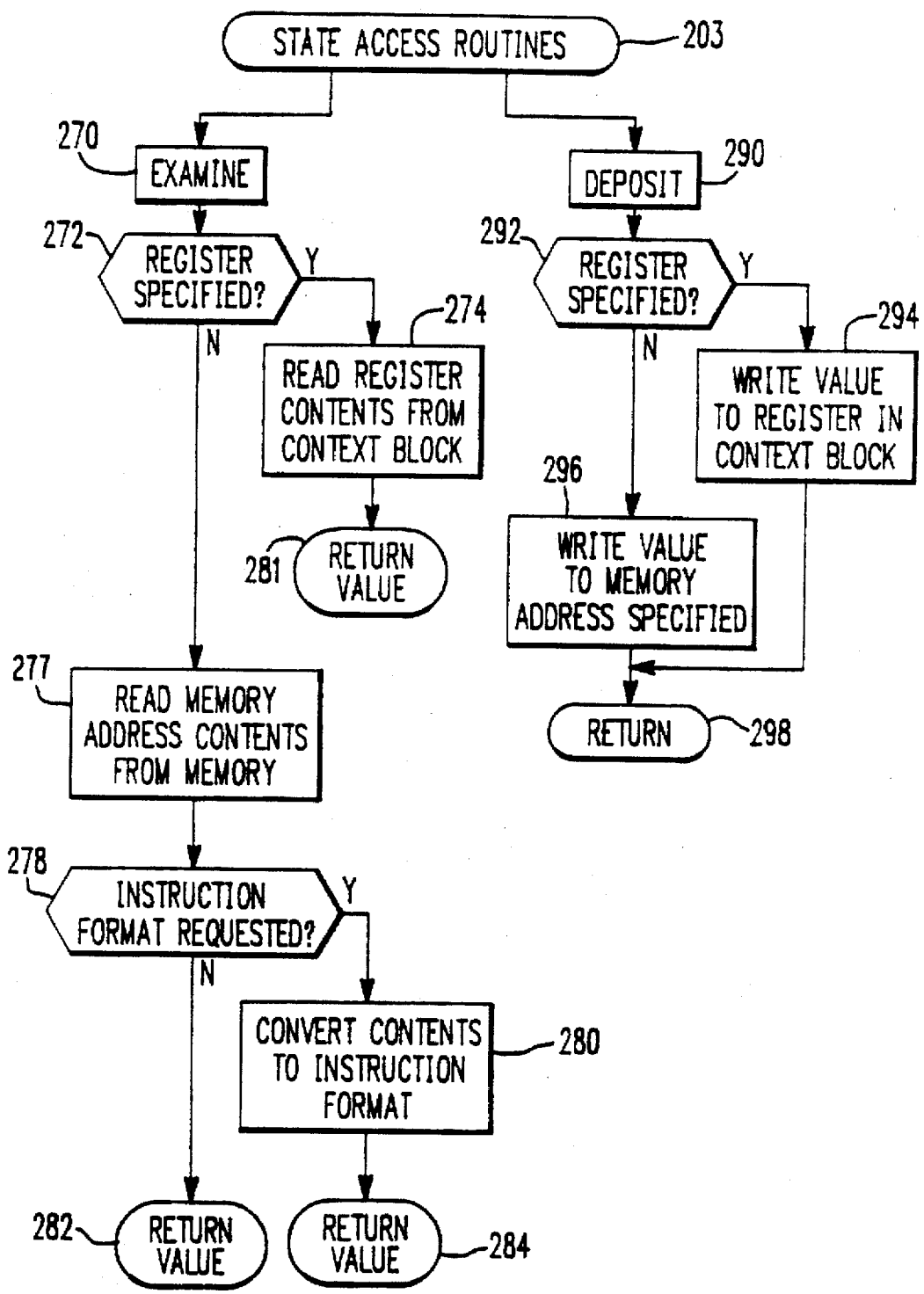
FIG. 6 shows flow charting for state access routines employed by the callable simulator.
Figure 7:
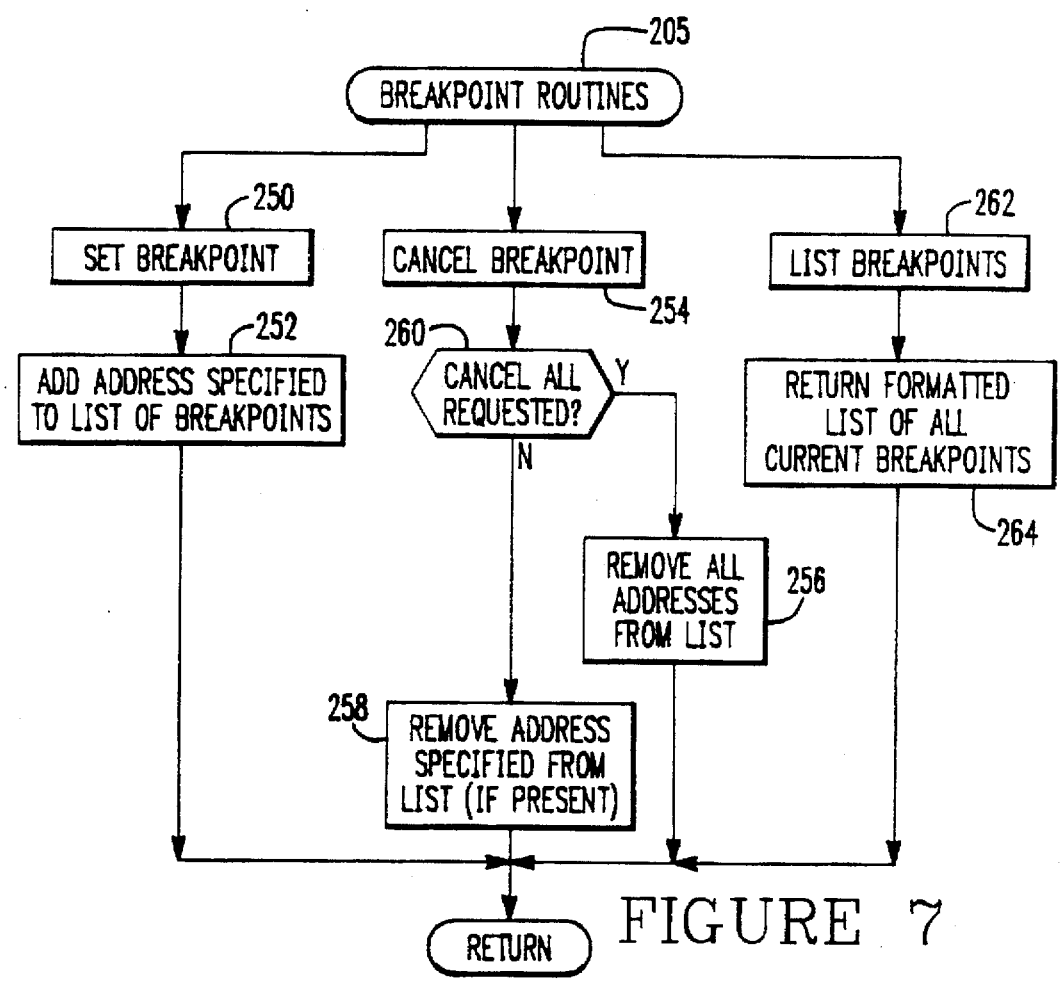
FIG. 7 shows flow charting for BREAKPOINT routines employed by the callable simulator.

As shown in FIG. 6, an EXAMINE routine 270 employs test block 272 to determine whether a read request has specified a register. If so, the register contents are read by block 274 from the context block 204 and a return is made.

If a memory read has been requested, block 276 reads the memory address contents from memory. Next, if test block 278 shows that instruction format has been requested, block 280 converts the memory contents to symbolic instruction format. A return with value is made from the EXAMINE routine either through block 282 or block 284.

If the block 284 returns an instruction format value, a symbolic representation is provided for a simulated machine (Y) instruction for use in the debugger 110 to show simulated machine instructions to the user in human-readable form. Since the registers 206 and 208 and the memory 207 and 209 are publicly accessible, the EXAMINE routine 270 need not be included in the simulator program code, but it is convenient, especially from a modularity standpoint, for program debugging purposes to do so.

A DEPOSIT routine 290 also makes a register request test in block 292. If a register is specified, block 294 writes the specified value to the register in the context block 204. Otherwise, the value is written to memory by block 296. A return is made from the DEPOSIT routine through block 298.

A callable SET BREAKPOINT routine 250 employs functional block 252 to create a breakpoint by adding the specified breakpoint address to a list of breakpoints kept in simulation private memory. Block 214 (FIG. 5) makes the breakpoint test by reference to the breakpoint list.

A callable CANCEL BREAKPOINT routine 254 either cancels all currently set breakpoints (block 256) or a specified breakpoint (block 258) according to a user request through test block 260. A LIST BREAKPOINTS routine 262 returns a formatted list of all breakpoints on user request, as indicated by block 264.

Various modifications and variations can be made in the improved simulator system and method especially adapted for code execution in a multi-code execution and debugging system within a multi-architecture environment of the present invention by those skilled in the pertaining art without departing from the scope and spirit of the invention. It is accordingly intended that the present invention embrace such modifications and variations to the extent they come within the scope of the appended claims and their equivalents.

What is claimed is:

1. In a computer system that embodies a first hardware (X) architecture providing an X domain and includes a memory system and a system operable in said X domain for executing and debugging multiple codes comprising X code, a system for simulating at least a second computer hardware (Y) architecture on said computer system comprising:

(A) means for simulating a Y architecture providing a Y domain characterized by a Y machine state;

(B) means for executing Y code on said simulating means;

(C) means for responding to calls from an environment manager coupled with said executing and debugging system to initiate operation of said Y code executing means when a code execution call is received; and (D) means for terminating each initiated Y-code execution in response to predetermined conditions and for making a corresponding return to said environment manager for execution of X code in said X domain by said executing and debugging system;

(E) said simulating system further including means for executing predetermined support services in response to calls therefor, said support service executing means including means for providing access to said Y machine state by said executing and debugging system, thereby enabling said executing and debugging system to debug said Y code during execution thereof in said Y domain by said Y code execution means in addition to debugging X code during execution thereof in said X domain by said executing and debugging system, whereby said executing and debugging system is operable in said X domain for debugging of code in both said X domain and said Y domain.

2. The simulating system of claim 1 wherein said access providing means includes means for reading said Y machine state and for writing to said Y machine state.

3. The simulating system of claim 1 wherein said access providing means includes means for processing Y-code and X-code breakpoints in the respective Y domain and X domain in response to breakpoint calls.

4. The simulating system of claim 3 wherein said processing means includes means for setting and cancelling Y-code and X-code breakpoints at specified memory addresses.

5. The simulating system of claim 4 wherein said processing means includes means for generating a list of active breakpoints in said X code and Y code as information for a system user.

6. The simulating system of claim 1 wherein said terminating means generates a return to said environment manager for a Y-code execution break if a breakpoint is set at the address in a Y-code program counter.

7. A computer system having a first hardware embodying a first architecture associated with a first instruction set providing a first domain including means for executing a first code including a plurality of instructions of said first instruction set, said computer system comprising:

A) simulating means for simulating a second architecture associated with a second instruction set providing a second domain for executing a second code including a plurality of instructions of said second instruction set, said second domain characterized by a machine state associated with each said second code instruction; and B) a debugger including a debugger program comprising instructions of said first instruction set executable by said computer system in said first domain for debugging said first code and second code, said debugger having access to machine state associated with code executed in said first domain;

C) said simulating means including means for providing support services for said debugger to enable said debugger to debug said second code, including i) means for providing said debugger with access to each said machine state of said second domain, and responsive to said debugger, for modifying said machine state, and ii) means for setting and storing breakpoints in said second code.

8. The computer system in accordance with claim 7, further comprising memory means for storing said first and second codes at a plurality of memory locations identified by unique addresses, and said breakpoint means identifies said breakpoints by storing a representation of said addresses of said first code and second code at which said breakpoints are to occur.

9. The computer system in accordance with claim 8, wherein said memory means stores a list of said breakpoints.

10. The computer system in accordance with claim 7, further including memory means for storing data, said memory means responsive to memory and read and memory write commands for respectively supplying and modifying said stored data, means for generating a call for cross-domain memory access under pre-determined conditions, including a memory data read failure and a memory data write failure.

11. The computer system in accordance with claim 7, wherein said state access means includes means for reading and writing to said machine state.

12. The computer system in accordance with claim 7, wherein said simulating means includes multiple registers, and said state access means includes means for writing to said registers, and means for reading the contents of said registers.

* * * * *